United States Patent
Menassa et al.

(10) Patent No.: US 7,617,017 B2
(45) Date of Patent: Nov. 10, 2009

(54) SYSTEM AND METHOD FOR RESOURCE REALLOCATION BASED ON AMBIENT CONDITION DATA

(75) Inventors: Roland J. Menassa, Macomb, MI (US); James W. Wells, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1058 days.

(21) Appl. No.: 11/061,134

(22) Filed: Feb. 18, 2005

(65) Prior Publication Data

US 2006/0190131 A1     Aug. 24, 2006

(51) Int. Cl.
*G05B 19/418* (2006.01)
*G05B 19/00* (2006.01)
*G05B 19/18* (2006.01)
*B23K 9/28* (2006.01)
*B23K 9/00* (2006.01)

(52) U.S. Cl. ................. 700/248; 700/245; 700/247; 700/250; 700/253; 219/78.01; 219/86.1; 219/86.7; 219/87

(58) Field of Classification Search ............. 700/46–47, 700/97, 99, 103, 108, 245, 247–248, 250, 700/253; 219/78.01, 86.1, 86.7, 87
See application file for complete search history.

(56) References Cited

U.S. PATENT DOCUMENTS

| | | | |
|---|---|---|---|
| 5,255,181 A * | 10/1993 | Chapman et al. | 705/8 |
| 7,139,629 B2 * | 11/2006 | Fromherz et al. | 700/100 |
| 7,151,966 B1 * | 12/2006 | Baier et al. | 700/19 |
| 2004/0216002 A1 * | 10/2004 | Fromherz et al. | 714/25 |
| 2005/0257136 A1 * | 11/2005 | Charisius et al. | 715/511 |
| 2006/0052898 A1 * | 3/2006 | Blumenfeld et al. | 700/108 |
| 2006/0136581 A1 * | 6/2006 | Smith | 709/224 |

* cited by examiner

*Primary Examiner*—Ramesh B Patel

(57) ABSTRACT

A system, method and apparatus for resource reallocation based on ambient condition data is disclosed herein. The system includes a planning module (102) for configuring plan data to include a primary sequence and an auxiliary sequence, a rule table (116) for storing the auxiliary sequence, an ambient condition receiver (124) for receiving the ambient condition data, and a routing processor (126) for accessing the rule table (116) to allocate an auxiliary sequence in place of a primary sequence in the event that particular ambient data is received.

17 Claims, 4 Drawing Sheets

SYSTEM AND METHOD FOR RESOURCE REALLOCATION BASED ON AMBIENT CONDITION DATA

TECHNICAL FIELD

This disclosure relates to adaptive programming of machines in a production environment.

BACKGROUND

In large scale manufacturing and assembly plants, such as those used in automobile manufacturing, hundreds of stations consisting of a plurality of machines may work simultaneously. In a large production environment, the production line may include miles of conveyors. Work in progress includes but is not limited to units of production, pallets, carriers, product and parts. A station may include a single or a plurality of machines. In an assembly plant, a station may be unmanned or include a staff operator.

A buffer is a storage area such as a conveyor, transport (i.e. forklift, cart, truck, etc.) silo between stations, or simply a place on the floor. An upstream buffer and a downstream buffer generally can hold parts in excess of standard in-process stock. If a buffer is empty, the station drawing from that buffer is starved. If a buffer is full, the station feeding that buffer will be blocked.

In a manufacturing, assembly, production, or any other type of plant, processes for operation of the machines are preplanned by process and plant engineers. During set up for production, processing for assembly operations breaks down the production process into components and assigns tasks to individual robots or machines. Machines such as welding machines are configured to operate in multiple dimensions and are programmable to weld specific spots on a product. Other machines, including stud weld or adhesive dispense machines are also configured in a similar fashion.

Once the plant process is determined, the weld robots, in particular, are manually assigned to a rigid set of weld sequences. In the event that ambient conditions change, that is, a machine or station is taken off line for reasons of malfunction or others, production may stop. In the event that there is a machine stoppage, manually rerouting product to a machine programmed to operate in the same manner as the stopped machine will allow production to continue.

Manually reallocating work from a halted machine or station to an operational station requires many physical steps and time. However, oftentimes, manual rerouting does not take place and the line will not start moving again until the stopped machine is restarted. In either event, buffers upstream become blocked and buffers downstream become starved. In the event that adjustments in production are needed, reassignment to balance workloads, accommodate product changes, or respond to individual equipment downtime conditions is accomplished manually.

SUMMARY OF THE INVENTION

Described herein is a system, method and apparatus for adaptively programming machines in an assembly line to change their sequence of operation in real time in response to ambient conditions.

The system includes a receiving module for receiving planner data from a process planner data base, a sequence module for determining one or more process sequences for each machine, an ambient condition receiver module for receiving ambient condition data, a rule module that processes ambient condition data and a routing module for reallocating resources when there is a deviation from the planner data as reflected by the ambient condition data.

DETAILED DESCRIPTION

In the manufacturing and assembly process, certain robots and machines are capable of carrying out a plurality of tasks. In the example provided by this description, the robot or machine is a welding robot. It will be understood that this description is applicable to any type of robot or machine used in the manufacturing or assembly process.

Certain welding robots are now available with a six axes integrated dress package that eliminates prior rigid motion sequence requirements due to a dress solution that is configured for a specific program path. Additionally, these robots include geometry based interference zones that allow pseudo random motion sequencing. The use of servo weld guns, provides a wider range of weld conditions which will enhance overall system flexibility. Moreover, the transition to object variable type interfaces from bit maps increases the ease and size of data exchange from input data to output data. Therefore, the range of motion of robots and machines has increased, as has their ability to be programmed from a remote location.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, flash drives, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
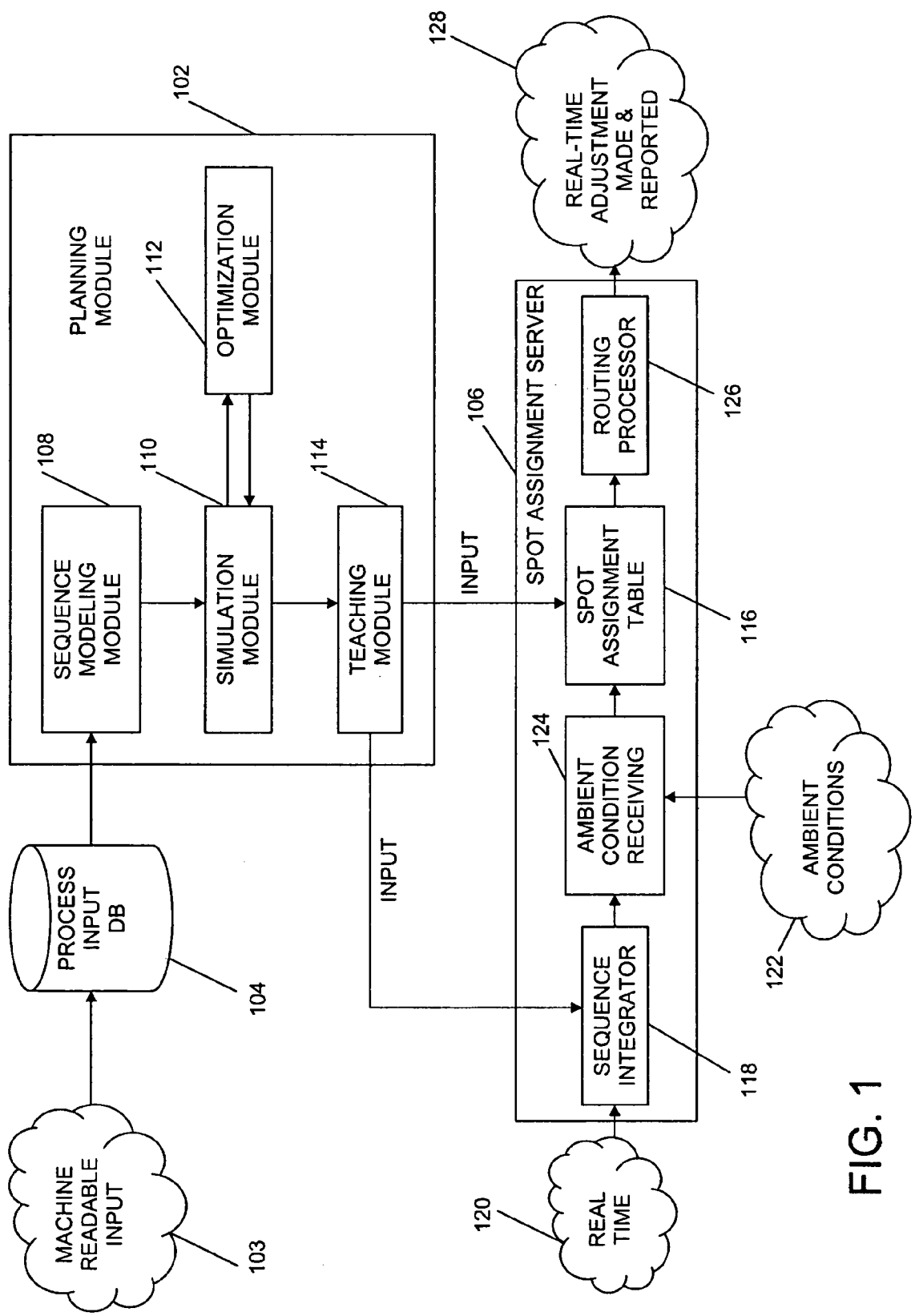
FIG. 1 depicts a system that includes a planning module for receiving process input and outputting configured data to a spot assignment server that in real-time may make adjustments to the operations sequences of robots and machines.
Figure 2:
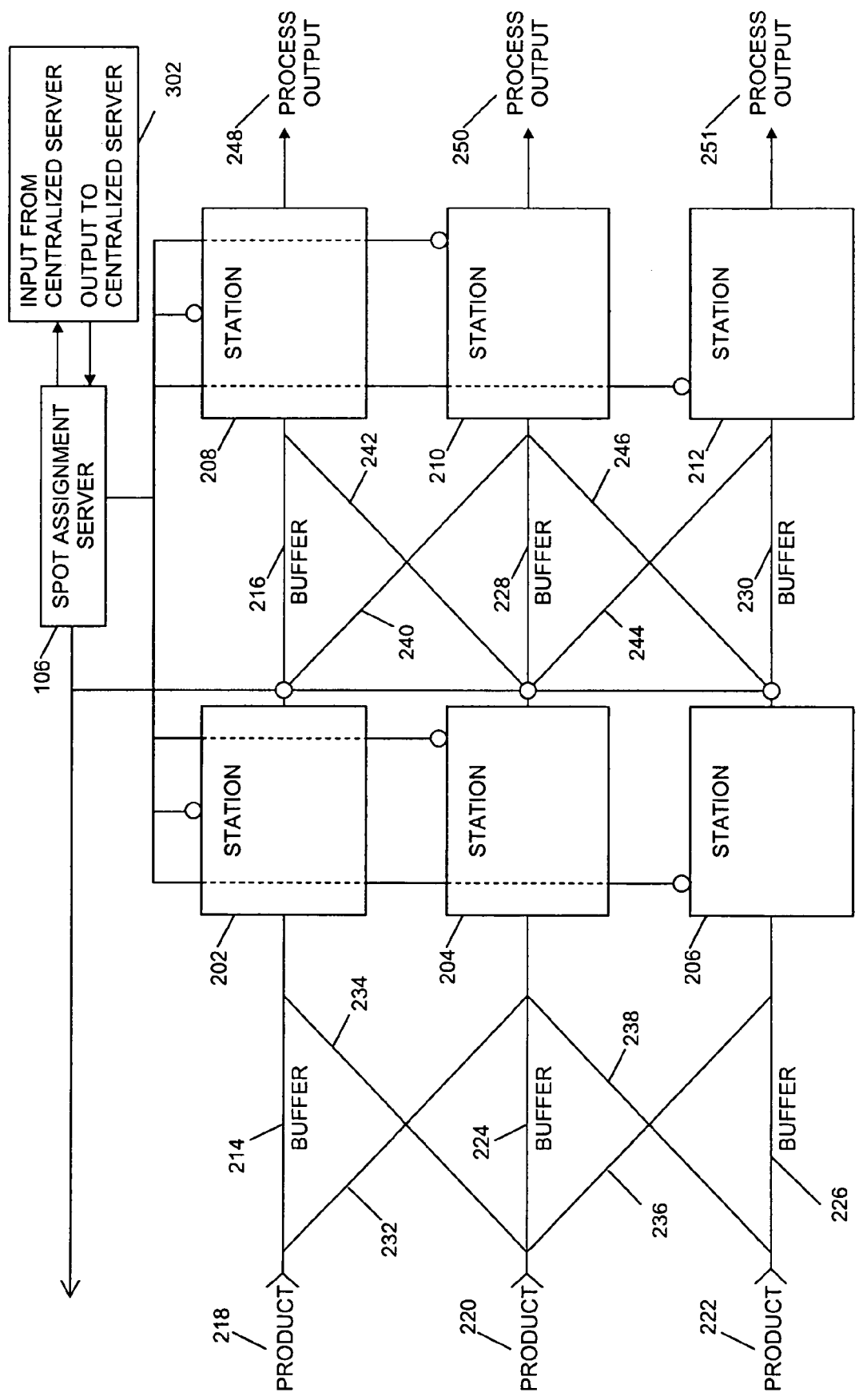
FIG. 2 depicts an assembly or manufacturing apparatus with a plurality of stations in parallel that are interconnected so that when a spot assignment server generates instructions for rerouting of a job from one station to another, the apparatus is physically capable of that redistribution.
Figure 3:
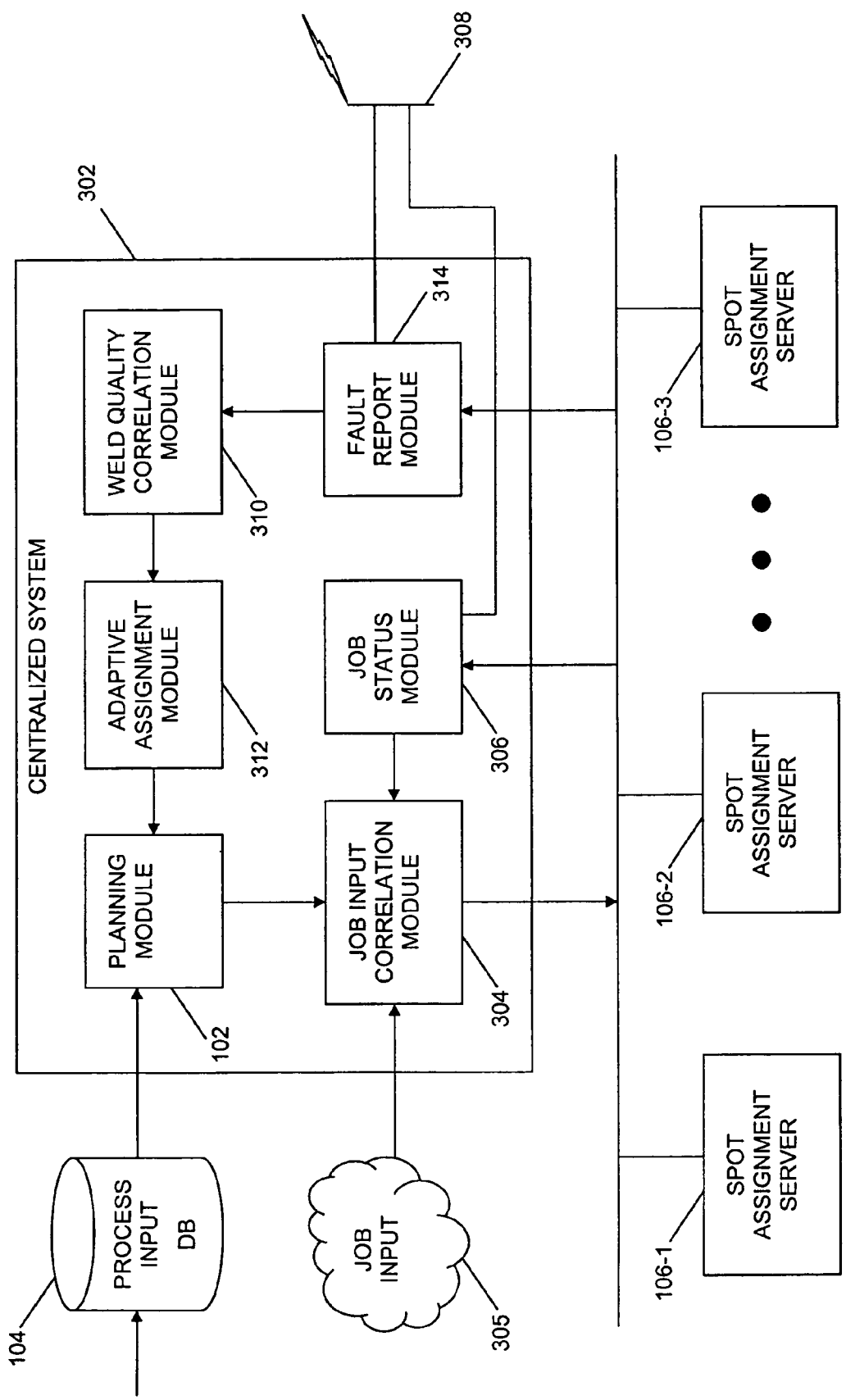
FIG. 3 depicts a centralized system including planning module and job input correlation modules as well as monitoring and fault reporting modules.

Bit maps, status tables, message strings or other data types that are (or can be translated into) a machine readable format may provide input that can be processed and translated into instructions for a robot or machine according to the method carried out by the system of FIGS. 1, 2 and 3. Automated process planning and plant floor networking as described in this disclosure may be configured to receive the process data in the form of a human readable data table.

Turning to FIG. 1 a system is depicted that includes a planning module 102 for receiving process input 103 at database 104 and outputting configured data, as described in detail below, to a spot assignment server 106. When process input data is manipulated to define a primary process for a line, a line segment, a station or a single machine, the weld spots for that process are identified by sequence modeling module 108. Also identified are auxiliary weld spot sequences that can be carried by a particular machine that correlate to the processes that may occur on either different lines or at stations along the same line.

Computer generated simulations of the primary and auxiliary sequences may be performed by the simulation module 110 which is in communication with optimization module 112. The simulations and optimizations are performed by a processor carrying out standard simulation and optimization instructions. The optimization models include those for minimizing the influence of the failure on the throughput rate. For example, the direct solution of the Mixed Integer Programming (MIP) using OPLStudio mathematical solver package may be used. There, four MIP models are formulated for different variations of the problem: i) a single-robot backup strategy; ii) a multi-robot backup strategy; iii) a multi-robot backup strategy with a limitation on the number of backup robots; and iv) a multi-robot backup strategy with linear cycle time estimation.

As an example shown below, the Single-Robot Backup (SRB) model may assume that the recovery plan is performed by a single robot. All groups of spots that were originally associated with the failed robots are re-allocated to a single robot, which satisfies the constraints and minimizes the throughput loss. The objective in the SRB model is to optimally choose the backup robot.

The objective function (1) minimizes the system's cycle time, i.e., equivalently maximizes the throughput rate. The cycle time constraint (2) enforces the system's cycle time to be larger than or equal to the assembly time of the most loaded robot. The assembly time of a single operational robot consists of two components as can be seen in the left hand side of constraint set (2). The first component captures the constant assembly time, namely, the initial assembly time of a specific robot, prior to any robot's failure. The second component contains the additional assembly time added to a working robot if it backups a failed robot. Constraint (3) assures that a single robot will perform the recovery. Spots recovery constraint (4) assures that a single operational robot will recover each group of spots previously performed by the failed robots. According to the recovery feasibility constraint (5) no recovered group of spots will be performed by a working robot other than the one chosen as the backup for the failed robot. Capability constraint (6) assures that the backed up groups of spots will be allocated only to robots, which are capable of performing these groups. Constraints sets (7) and (8) are precedence constraints.

According to these constraints, the failing groups of spots will be performed after their immediate predecessors have been done and before their immediate successors have started. As shown in FIG. 1, in this model, all backed-up groups of spots are allocated to the same recovering robot, and therefore, there is no need to address the precedence relations among the failing groups. Constraints sets (9) and (10) are integrality constraints and (11) is the non-negativity constraint of the cycle time, c.

Following is Model SRB set out in mathematical terms:

$$\text{Minimize } c \tag{1}$$

Subject to:

$$\sum_{i \in I_W} T_i \cdot IM_{ir} + \sum_{i \in I_F} T_i \cdot rm_{ir} \leq c \; \forall \, r \in R_W \tag{2}$$

$$\sum_{r \in R_W} x_r = 1 \tag{3}$$

$$\sum_{r \in R_W} rm_{ir} = 1 \; \forall \, i \in I_F \tag{4}$$

$$x_r \geq rm_{ir} \; \forall \, i \in I_F, \, \forall \, r \in R_W \tag{5}$$

$$rm_{ir} \leq CM_{ir} \; \forall \, i \in I_F, \, \forall \, r \in R_W \tag{6}$$

$$\sum_{k \in R_W} k \cdot IM_{hk} \leq \sum_{i \in R_W} l \cdot rm_{il} \; \forall \, i \in I_F, \, \forall \, h \in IPW_i \tag{7}$$

$$\sum_{k \in R_W} k \cdot rm_{ik} \leq \sum_{l \in R_W} l \cdot IM_{hl} \; \forall \, i \in I_F, \, \forall \, h \in ISW_i \tag{8}$$

$$rm_{ir} \in \{0, 1\} \; \forall \, i \in I_F, \, \forall \, r \in R_W \tag{9}$$

$$x_r \in \{0, 1\} \; \forall \, r \in R \tag{10}$$

$$c \geq 0 \tag{11}$$

By performing simulations of the primary process and auxiliary processes, and then optimizing their sequences, the planning module 102 may generate a plan for the spot assignment server to allocate and reallocate resources when there is a deviation from the planner data taught to a robot by the teaching module 114. A loop back to the sequence modeling module 108 any point in the process such as the simulation module 110 is also available to change the sequence, for example, by adding new process input from the process input database 104.

Modules contemplated herein may provide interim steps to generating sequencing, simulation, optimization and teaching of the planning module 102. While the module processes may not be necessarily accomplished in the order or manner described herein, changing the weld sequences of parallel and/or sequential robots according to data of a spot assignment table in response to ambient data input may be still accomplished.

The steps carried out by the planning module 102 generate a spot assignment table 116. The spot assignment table includes sequences of auxiliary spots that specific robot and weld equipment can reach and execute. A rule table such as spot assignment table 116 may include correlated data for quickly accessing alternative sequences when a primary weld sequence of a particular machine or station is interrupted. A database subset of the information stored in the rule table may include feasible spots for an equipment such including geoset and respot welds. Geoset welds are welds that fix the geometric relationship of multiple parts into one structure while those parts are being fixtured. Whereas respot welds are the remaining welds that provide the necessary strength to the structure to meet the requirements of a specific application and are not required to be applied while the parts are in a specific geometry setting fixture. The rules table may be updated during the production lifecycle as well as during the teaching process. Additionally, the teaching module 114 may further provide input to the spot assignment server 106 for the initial sequence instructions to a machine by sequence integrator 118.

Briefly turning to FIG. 2, an assembly or manufacturing apparatus with a plurality of stations that are in parallel is depicted. The stations are interconnected so that when a spot assignment server generates instructions for rerouting of a job from one station to another, the assembly or manufacturing apparatus is physically capable of redistributing the job. Stations 202, 204, 206, 208, 210 and 212 are composed of one or more machines that in the instant embodiment described are welding robots. The spot assignment server 106 may operate to a plurality of stations as shown herein or a single station. Here, station 202 is fed by upstream buffer 214 and releases product to downstream buffer 216.

Briefly turning to FIG. 3, a centralized system 302 may provide input from the planning module 102 to the spot assignment server 106. Centralized system 302 includes the planning module 102 and the job input correlation module 304 as well as the monitoring and fault reporting modules to be discussed in detail below. Returning to FIG. 2, product 218, 220 and 222 are introduced according to the job input correlation module 304 into the upstream buffers 214, 224 and 226 to be welded at Stations 202, 204 and 206. The processed product is output into downstream buffers 216, 228 and 230.

Now returning to FIG. 1, in real-time 120, the sequence installer 118 may have previously provided the primary welding sequence for the robot. When an ambient condition 122 has occurred, the ambient condition receiver 124 receives data relating to the ambient condition 122. An ambient condition 122 may be, for example, weld faults, bypass modes, cycle-time optimizations, and real-time flexible process changes. Depending upon the ambient condition, the spot assignment server 106 processes instructions to access the spot assignment table 116 to access (or in another embodiment, to generate) a rule for how to alter the assembly or manufacturing line process in order to maintain its flow. The rule data is communicated to the routing processor 126 so that the real-time adjustment can be made and reported 128.

Returning to FIG. 2, the cross channels 232, 234, 236, 238, 240, 242, 244 and 246 are depicted to illustrate the movement of products in an embodiment including a manufacturing system of parallel assembly or serial assembly lines. The product may be manually or automatically moved from line to line in the event of an ambient condition change and a rerouting instruction.

Now returning to FIG. 3, a centralized system 302 including the planning module 102 and the job input correlation module 304 as well as the job status 306 and fault reporting modules 314 are depicted. As mentioned above, the rules of the spot assignment table 116 of spot assignment server 106 may be updated periodically or continuously as job input 305 is processed by job input correlation module 304. The updated correlated data is communicated to one or more spot assignment servers 106-1, 106-2 and 106-3.

The network of spot assignment servers 106-1, 106-2 and 106-3 report to a job status module 306 that may also be in communication with job input correlation module 304 for continuously updating the data stored in the spot assignment servers 106. As a job is indexed to a station, the conventional style code and spot assignment list (based on standard weld spot naming convention in this embodiment) is communicated to the station or robot system. The local robot program executes the motion to the spots and reports any weld faults (in the event of server failure, the robot executes its baseline style program minus any previously executed spots already performed upstream based on a local read of the job's list of executed spots). A running total of successfully executed spots is maintained with each job in the system (as stored in a command server, in a shift register, and/or an RF tag).

Additionally the network of spot assignment servers 106-1, 106-2 and 106-3, upon activity by the ambient condition receiver 124 and routing processor 126, make reports to the fault report module 314. If any spots are missed, these are evaluated in an optimal solution based on ambient data for assignment to the best subsequent system based on minimal system cycle time impact. At the moment any robot in the system is bypassed, this status is analyzed as part of ambient data and its spots are dynamically reallocated both upstream and downstream. Spots that cannot be picked up with an alternative robot may be assigned in the manual backup station.

As soon as the server resolves a manual spot (possibly several spots upstream of the manual station), a message via signal processor 308 is sent to the zone superintendent's PDA, a status marquee, or other electronic notification device, recommending that he should temporarily assign an operator to that normally unmanned station so (with a time projection) to pick up the spot(s). Once the job has indexed into the manual station, graphical instructions are provided, in one embodiment, on a large HMI screen as to which spots to complete, such information being extracted from the process planning module 102.

Error proofing logic in the manual station ensures that the proper back-up gun and schedule is used and that this information is recorded in the jobs' completed spot list. For example, the centralized system includes a weld quality correction module 310 where information is processed and retained for later correlation with weld quality checks in order to track any issues back to a specific welding station and robot. An adaptive assignment module 312 may track weld assignment impact on system throughput. Reports to job status module 306 and module 314 may be followed by a process planning activity by the process planning module 102.

Welds that have multiple backup solutions build a fallback list that gives priority to the alternative that has had the least impact on system throughput in the past. As system throughput varies, spots may be moved continuously in an attempt to balance process throughput. If a small amount of reserve capacity is processed into the system, certain maintenance tasks could be performed during production operation with little or no impact on the system operation. The capability to dynamically allocate work may also enable more parallelism in the process that, when teamed up with flexible fixturing, may significantly increase system flexibility and reduce model introduction lead-time.

Figure 4:
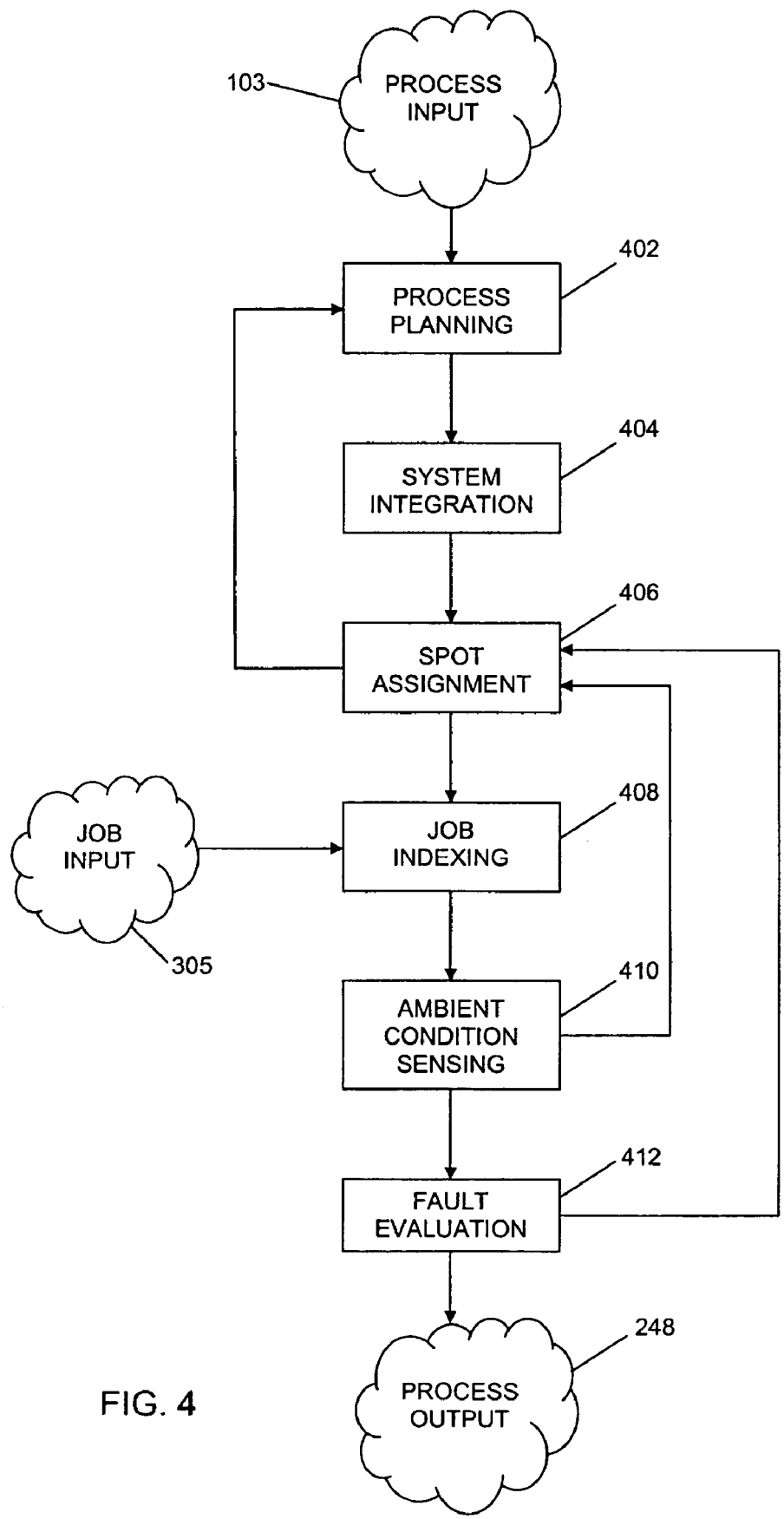
FIG. 4 depicts a method for carrying out the steps taken by the systems and apparatus of FIGS. 1-3.

FIG. 4 depicts a method may include steps shown therein taken by the systems and apparatus of FIGS. 1-3. The process planning step 402 as described in detail with respect to FIG. 1 is shown as a step prior to that of system integration step 404. The spot assignment step 406 condenses the rules into a rule database. The table correlates robots to weld spots, and in one embodiment, spot weld position coordinate information. Additionally, correlations to weld guns and weld capability are arranged so that the table may be accessed for adjustments in real-time.

The job input 305 is processed at the job indexing step 408 which was discussed with reference to the job input correlation module 304 of FIG. 3. The ambient condition sensing step 410 provides ambient condition data. The data generated in the fault evaluation step in 412 in conjunction with the ambient sensing step 410 is used to dynamically update the spot assignment server 106 which may also trigger additional process planning by planning module 102.

While the above discussion has been in reference to welding machinery, and similarly functioning machinery, the technology described in may be used in all operations where in changing ambient conditions, product transfer between stations or machines may improve efficiency.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element or element's function from another.

The invention claimed is:

1. A system for resource reallocation between a first and a second welding robot based on ambient condition data, the system comprising:
    a planning module for receiving process input and, in response thereto, for outputting configured plan data defining a primary process for execution by the first and the second welding robot including a primary weld spot sequence and an auxiliary-weld spot-sequence selectively executable by either of the respective first and second welding robots, wherein the planning module generates a spot assignment table including the auxiliary weld spot sequence;
    a spot assignment server for receiving and storing the spot assignment table, and having an ambient condition receiver for receiving and processing the ambient condition data; and
    a routing processor in communication with the spot assignment server and adapted for accessing the spot assignment table to allocate the auxiliary weld spot sequence from the second welding robot to the first welding robot in the event that the ambient condition data is received by the ambient condition receiver;
    wherein the ambient condition data describes a condition wherein the second welding robot is off line.

2. The system as recited in claim 1 further comprising:
    a process input database for receiving machine readable process input for use by the planning module.

3. The system as recited in claim 2 wherein the planning module comprises:
    a sequence modeling module for receiving the process input and for identifying the weld spots required for the primary weld spot sequence and for the auxiliary weld spot sequence.

4. The system as recited claim 3 wherein the planning module further comprises:
    a simulation module for simulating the primary weld spot sequence and the auxiliary weld spot sequence.

5. The system as recited in claim 4 wherein the planning module further comprises:
    an optimization module in communication with the simulation module for optimizing the primary weld spot sequence and the auxiliary weld spot sequence, wherein the optimization module includes a Mixed Integer Programming (MIP) model.

6. The system as recited in claim 1 wherein the planning module further comprises:
    a first teaching module in communication with the rule module for assigning the primary weld spot sequence and the auxiliary weld spot sequence to the rule module.

7. The system as recited in claim 1, wherein the spot assignment server includes a sequence integrator for programming the first welding robot with the primary weld spot sequence, wherein the planning module further comprises a second teaching module in communication with a sequence integrator.

8. A method for resource reallocation based on ambient condition data, the method comprising:
    using a planning module to configure plan data in response to process input, wherein the plan data defines a primary weld spot sequence executable by a first welding robot and an auxiliary weld spot sequence selectively executable by either of a second welding robot and the first welding robot;
    storing the auxiliary weld spot sequence in a spot assignment table within a spot assignment server;
    receiving and processing the ambient condition data using the spot assignment server; and
    accessing the spot assignment table using the spot assignment server to thereby allocate the auxiliary weld spot sequence to the first welding robot in place of the primary weld spot sequence when the ambient condition data is received by the spot assignment server;
    wherein the ambient condition data describes a condition wherein the second welding robot is off line.

9. The method as recited in claim 8 further comprising:
    simulating the primary weld spot sequence and the auxiliary weld spot sequence using the planning module.

10. The method as recited in claim 9 wherein the planning module further comprises:
    optimizing the primary weld spot sequence and the auxiliary weld spot sequence using a Mixed Integer Programming (MIP) model.

11. The method as recited in claim 8 further comprising:
    instructing the first welding robot in real time to change its sequence from the primary weld spot sequence to the auxiliary weld spot sequence in the event that ambient condition data is received.

12. A system for resource allocation between a first and a second welding robot based on ambient condition data, wherein the ambient condition data describes a condition wherein the second welding robot is off line, the system comprising:
    a spot assignment server capable of instructing the first and the second welding robot using at least one of a primary and an auxiliary weld spot sequence, wherein the first welding robot is programmed to selectively execute either of the primary and the auxiliary weld spot sequence, and wherein the second welding robot is capable of executing at least the auxiliary weld spot sequence;
    an ambient condition receiver adapted for receiving the ambient condition data;
    a first upstream buffer providing product to the first welding robot;
    a second upstream buffer providing product to the second welding robot;
    wherein product in the second upstream buffer is transferable to the first upstream buffer when the ambient condition receiver receives the ambient condition data, and wherein the spot assignment server instructs the first welding robot to execute the auxiliary weld spot sequence.

13. The system as recited in claim 12 wherein the transferability of the product in the second upstream buffer to the first upstream buffer is automatic.

14. The system as recited in claim 13 wherein the transferability of the product in the second upstream buffer to the first upstream buffer is manual.

15. The system as recited in claim 12 wherein the spot assignment server is adapted for storing a spot assignment table generated by a planning module that is separate from the spot assignment server.

16. The system as recited in claim 12 further comprising a computerized planner adapted for simulating the primary weld spot sequence and the auxiliary weld spot sequence.

17. The system as recited in claim 16 wherein the computerized planner further comprises:

an optimizer in communication with the simulator for optimizing the primary weld spot sequence and the auxiliary weld spot sequence, wherein the optimizer includes a Mixed Integer Programming (MIP) model.

* * * * *